(12) United States Patent
Qin et al.

(10) Patent No.: US 11,630,348 B2
(45) Date of Patent: Apr. 18, 2023

(54) BACKLIGHT MODULES AND DISPLAY DEVICES

(71) Applicants: BOE MLED Technology Co., Ltd., Beijing (CN); BOE Technology Group Co., Ltd., Beijing (CN)

(72) Inventors: Pei Qin, Beijing (CN); Yutao Hao, Beijing (CN); Donglei Li, Beijing (CN); Hui Liu, Beijing (CN); Shuo Wang, Beijing (CN); Jiaxin Li, Beijing (CN); Ying Chen, Beijing (CN); Jie Gao, Beijing (CN); Honghao Yu, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/837,630

(22) Filed: Jun. 10, 2022

(65) Prior Publication Data

US 2022/0413342 A1 Dec. 29, 2022

Related U.S. Application Data

(63) Continuation-in-part of application No. PCT/CN2021/102542, filed on Jun. 25, 2021.

(51) Int. Cl.
*G02F 1/1335* (2006.01)
*G02F 1/13357* (2006.01)
*F21V 8/00* (2006.01)

(52) U.S. Cl.
CPC ..... *G02F 1/133617* (2013.01); *G02B 6/0026* (2013.01); *G02F 1/133608* (2013.01); *G02F 1/133614* (2021.01)

(58) Field of Classification Search
CPC ......... G02F 1/133614; G02F 1/133617; G02B 6/0026
See application file for complete search history.

(56) References Cited

U.S. PATENT DOCUMENTS

2015/0009454 A1\* 1/2015 Nagatani ................ F21S 6/002
362/601
2016/0291231 A1 10/2016 Jang et al.
(Continued)

FOREIGN PATENT DOCUMENTS

| CN | 101093783 A | 12/2007 |
| CN | 104865749 A | 8/2015 |

(Continued)

OTHER PUBLICATIONS

PCT/CN2021/102542 international search report.
PCT/CN2021/102542 Written Opinion.

*Primary Examiner* — Sean P Gramling
(74) *Attorney, Agent, or Firm* — IPro, PLLC (57) ABSTRACT

A backlight module and a display device are disclosed. The backlight module includes: a back plate (1); a middle frame (3) disposed on the back plate (1); a light-emitting substrate (2) disposed on the back plate (1) and in the middle frame (3), the light-emitting substrate (2) including a first light-emitting area (203) and a second light-emitting area (204) surrounding the first light-emitting area (203), and the second light-emitting area (204) being close to an edge of the light-emitting substrate (2); a light compensation structure (100) close to the edge of the light-emitting substrate (2), the light compensation structure (100) including one or more light conversion materials. The backlight module and the display device can improve the display effect.

14 Claims, 5 Drawing Sheets

(56) References Cited

U.S. PATENT DOCUMENTS

2020/0064690 A1    2/2020   Xu et al.
2021/0389629 A1   12/2021   Chiu et al.

FOREIGN PATENT DOCUMENTS

| | | |
|---|---|---|
| CN | 106019697 A | 10/2016 |
| CN | 106324746 A | 1/2017 |
| CN | 206020885 U | 3/2017 |
| CN | 107065305 A | 8/2017 |
| CN | 208041696 U | 11/2018 |
| CN | 110646981 A | 1/2020 |
| CN | 111856815 A | 10/2020 |
| TW | I708100 B | 10/2020 |
| TW | M611743 U | 5/2021 |

\* cited by examiner

BACKLIGHT MODULES AND DISPLAY DEVICES

CROSS REFERENCE TO RELATED APPLICATIONS

The present application is a continuation application of International patent application No. PCT/CN2021/102542 filed on Jun. 25, 2021, the contents of which are incorporated here in its entirety by reference.

TECHNICAL FIELD

The present disclosure relates to the field of display technologies, in particular to backlight modules and display devices.

BACKGROUND

With the development of display technologies, display devices have attracted more and more attention.

A display device typically includes a backlight module and a display panel. The backlight module is used to provide a light source for the display panel. The display panel generally includes a lower polarizer, an array substrate, a liquid crystal layer, a color filter substrate and an upper polarizer that are sequentially disposed. Light emitted by the backlight module passes through the lower polarizer, the array substrate, the liquid crystal layer, the color filter substrate and the upper polarizer sequentially, thereby realizing display. However, the display effect of such display device is poor.

SUMMARY

The purpose of the present disclosure is to provide a backlight module and a display device, which can improve the display effect.

According to an aspect of the present disclosure, there is provided a backlight module, including:

a back plate;

a middle frame disposed on the back plate;

a light-emitting substrate disposed on the back plate and in the middle frame, the light-emitting substrate including a first light-emitting area and a second light-emitting area surrounding the first light-emitting area, and the second light-emitting area being close to an edge of the light-emitting substrate; and a light compensation structure close to the edge of the light-emitting substrate, the light compensation structure including one or more light conversion materials.

Further, a surface of the light-emitting substrate facing away from the back plate is provided with a protective layer, an area of the protective layer corresponding to the second light-emitting area is doped with light conversion particles, and the area of the protective layer doped with the light conversion particles constitutes the light compensation structure.

Further, the light-emitting substrate has a light-emitting color of blue, and the light conversion particles include one or more yellow light conversion materials.

Further, the light-emitting substrate has a light-emitting color of blue, and the light conversion particles include one or more red light conversion materials and one or more green light conversion materials.

Further, light emitted from the first light-emitting area is blue light after passing through an area of the protective layer corresponding to the first light-emitting area, and the backlight module further includes a color conversion layer disposed on a side of the light-emitting substrate away from the back plate, where the color conversion layer includes one or more red light conversion materials and one or more green light conversion materials, or the color conversion layer includes one or more yellow light conversion materials.

Further, the backlight module further includes a color conversion layer disposed on a side of the light-emitting substrate away from the back plate, where the color conversion layer is a green quantum dot layer, and an area of the protective layer corresponding to the first light-emitting area is doped with one or more red light conversion materials.

Further, the protective layer includes a sealing adhesive.

Further, the light-emitting substrate includes:

a base disposed on the back plate; and a plurality of light-emitting units disposed on a surface of the base facing away from the back plate, where the protective layer includes a plurality of protective units, one protective unit of the plurality of protective units covers a light-emitting surface of one light-emitting unit of the plurality of light-emitting units and is in direct contact with the light-emitting surface of the light-emitting unit, and a surface of the protective unit facing away from the light-emitting unit is a curved surface.

Further, a doping concentration of the light conversion particles gradually decreases along a direction that an edge of the protective layer is close to an inside of the protective layer.

Further, the light compensation structure is disposed on an inner wall of the middle frame.

Further, the light compensation structure includes:

a plurality of light conversion units disposed on the inner wall of the middle frame.

Further, the inner wall of the middle frame provided with the plurality of light conversion units includes a first area and a second area with a same area, the first area is located on a side of the second area away from the light-emitting substrate, and a density of the light conversion units disposed in the first area is greater than a density of the light conversion units disposed in the second area.

Further, the inner wall of the middle frame provided with the plurality of light conversion units includes a first area and a second area, the first area is located on a side of the second area away from the light-emitting substrate, and a size of the light conversion units disposed in the first area is larger than a size of the light conversion units disposed in the second area.

Further, the middle frame includes a first frame segment and a second frame segment that are connected to each other, the first frame segment is disposed on the back plate, the second frame segment is disposed on a side of the first frame segment away from the back plate, an inner diameter of the second frame segment gradually increases along a direction away from the first frame segment, the first area is located on an inner wall of the second frame segment, and the second area is located on an inner wall of the first frame segment.

Further, the inner wall of the middle frame is provided with a reflector, and the plurality of light conversion units are disposed on the reflector.

Further, the light-emitting substrate has a light emission color of blue, and the plurality of light conversion units are yellow light conversion units.

Further, the one or more light conversion materials include one or more fluorescent materials or quantum dot materials.

According to an aspect of the present disclosure, there is provided a display device including the above-mentioned backlight module.

In the backlight module and the display device of the present disclosure, the second light-emitting area is close to the edge of the light-emitting substrate, the light compensating structure is close to the edge of the light-emitting substrate, and the light compensating structure includes one or more light conversion materials, so that the light compensating structure can emit light with one or more specific colors under the irradiation of the second light-emitting area. The light with the one or more specific colors emitted by the light compensation structure is mixed with the light emitted from the second light-emitting area, which can solve the problem of color shift caused by the light emitted from the second light-emitting area and passing through a gap between a dimming film and the middle frame, and improve the display effect.

Descriptions of reference numerals: 1. back plate; 2. light-emitting substrate; 201. base; 202. light-emitting unit; 203. first light-emitting area; 204. second light-emitting area; 3. middle frame; 301. first frame segment; 302. second frame segment; 303. first area; 304. second area; 4. protective layer; 401. protective unit; 5. light conversion particle; 6. color conversion layer; 7. prism sheet; 8. display panel; 9. diffusion sheet; 10. light conversion unit; 100. light compensation structure.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The exemplary embodiments described below do not represent all embodiments consistent with the present disclosure. Rather, they are merely examples of device consistent with some aspects of the present disclosure, as recited in the appended claims.

In the related art, a backlight module of a display device includes a light-emitting substrate, a dimming film, and a middle frame. The dimming film and the light-emitting substrate are stacked, and the dimming film is located on a light-emitting side of the light-emitting substrate for modulating light emitted from the light-emitting substrate, such as color conversion. The middle frame surrounds the light-emitting substrate and the dimming film. However, the dimming film shrinks when the temperature is low, resulting in a gap between the dimming film and the middle frame, so that part of the light emitted from the light-emitting substrate passes through the gap between the dimming film and the middle frame, thereby forming a gradual color shift/color cast, which reduces the display effect of the display device.

Figure 1:
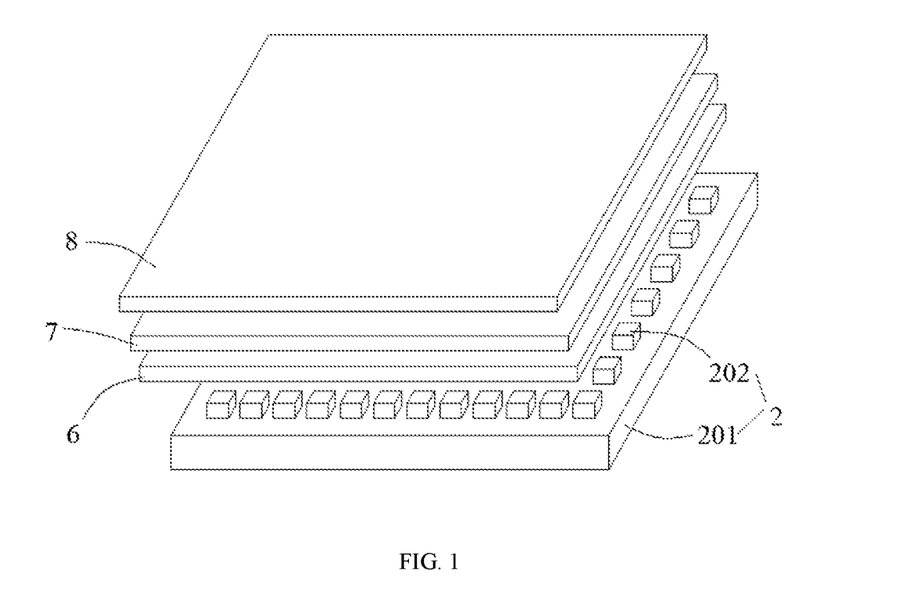
FIG. 1 is an exploded schematic view of a display device according to an embodiment of the present disclosure.
Figure 2:
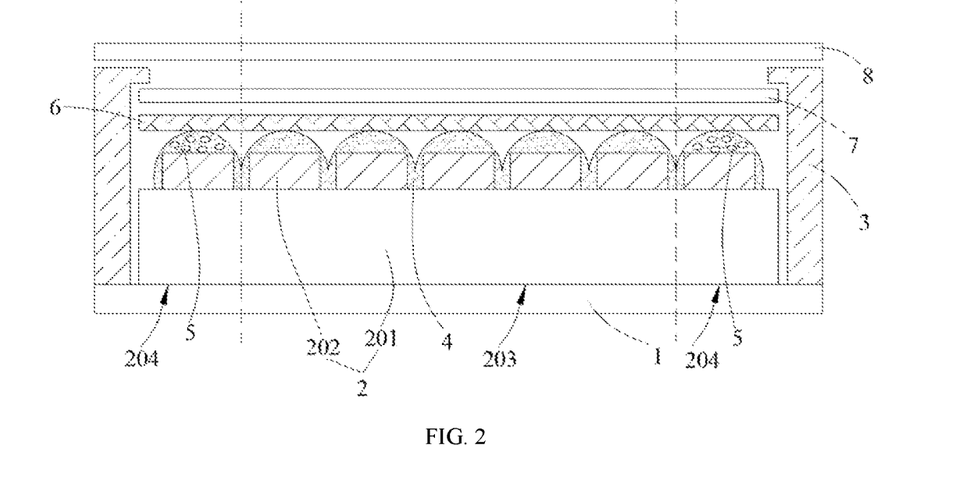
FIG. 2 is a schematic diagram of a display device according to an embodiment of the present disclosure.
Figure 5:
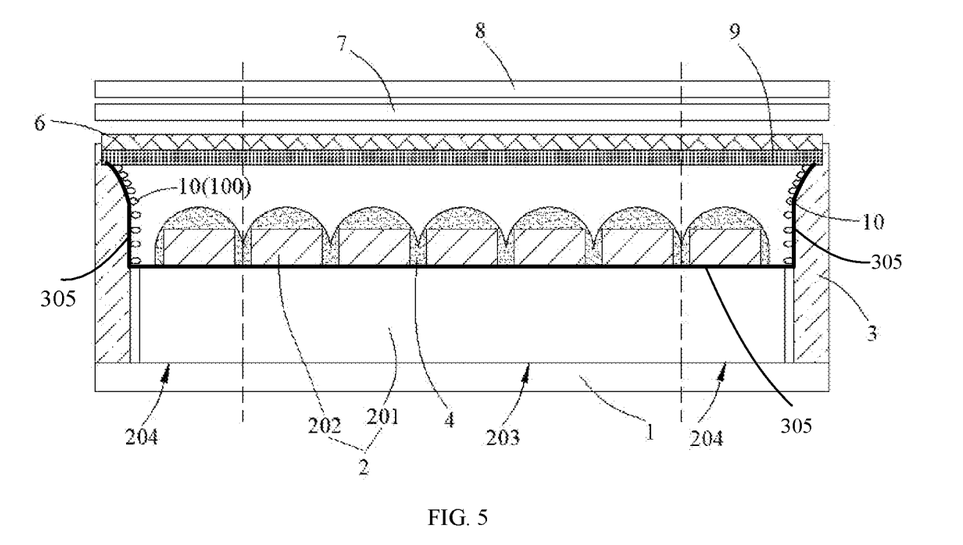
FIG. 5 is a schematic diagram of another display device according to an embodiment of the present disclosure.

An embodiment of the present disclosure provides a backlight module. The backlight module is applied to a display device. As shown in FIG. 1, FIG. 2 and FIG. 5, the backlight module includes a back plate 1, a middle frame 3, a light-emitting substrate 2 and a light compensation structure 100.

The middle frame 3 is disposed on the back plate 1. The light-emitting substrate 2 is disposed on the back plate 1 and located in the middle frame 3. The light-emitting substrate 2 includes a first light-emitting area 203 and a second light-emitting area 204 surrounding the first light-emitting area 203. The second light-emitting area 204 is close to an edge of the light-emitting substrate 2. The light compensation structure 100 is close to the edge of the light-emitting substrate 2, and the light compensation structure 100 includes one or more light conversion materials.

In the backlight module according to the embodiment of the present disclosure, the second light-emitting area 204 is located at the edge of the light-emitting substrate 2, and the light compensation structure 100 is close to the edge of the light-emitting substrate 2. The light compensation structure 100 includes one or more light conversion materials for converting the color of light emitted by the light-emitting substrate 2, so that the light compensation structure 100 can emit light with one or more specific colors under the irradiation of the second light-emitting area 204. The light with the one or more specific colors emitted by the light compensation structure 100 is mixed with light emitted from the second light-emitting area 204, which can solve the problem of color shift caused by the light emitted from the second light-emitting area 204 and passing through a gap between a dimming film and the middle frame 3, and improve the display effect.

The backlight module according to embodiments of the present disclosure will be described in detail below.

Figure 6:
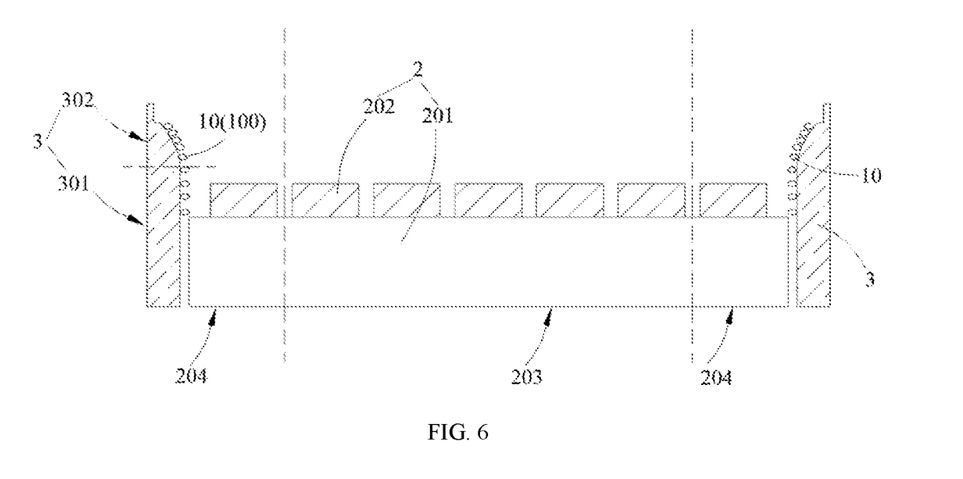
FIG. 6 is a schematic diagram of a part of the structure shown in FIG. 5.

As shown in FIG. 2, the back plate 1 is a support structure of the backlight module. A side of the back plate 1 is provided with a bearing surface. The middle frame 3 can be disposed on the bearing surface of the back plate 1. As shown in FIG. 5 and FIG. 6, the middle frame 3 may include a first frame segment 301 and a second frame segment 302 along a direction perpendicular to the back plate 1. The first frame segment 301 and the second frame segment 302 are connected to each other. The first frame segment 301 can be disposed on the back plate 1, and the second frame segment 302 can be disposed on a side of the first frame segment 301 away from the back plate 1. An inner diameter of the second frame segment gradually increases along a direction away from the first frame segment 301. A surface of an inner wall of the second frame segment 302 may be a smoothly curved surface. The first frame segment 301 has a uniform inner diameter in the direction perpendicular to the back plate 1. The inner diameter of the second frame segment 302 may be larger than the inner diameter of the first frame segment 301. In addition, the middle frame 3 may include a mold frame.

Figure 3:
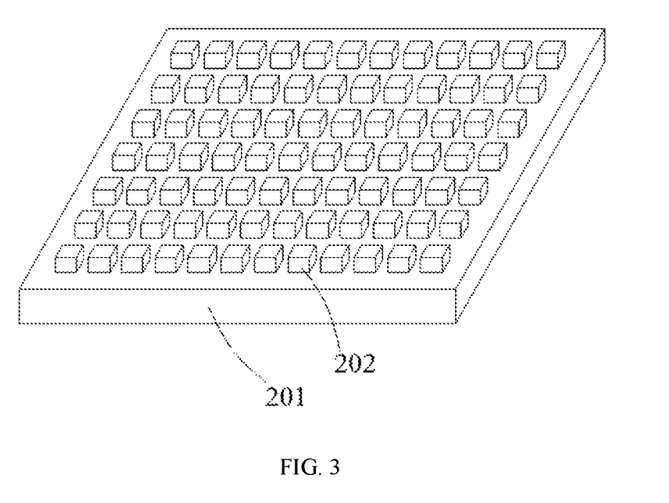
FIG. 3 is a schematic diagram of a light-emitting substrate according to an embodiment of the present disclosure.
Figure 7:
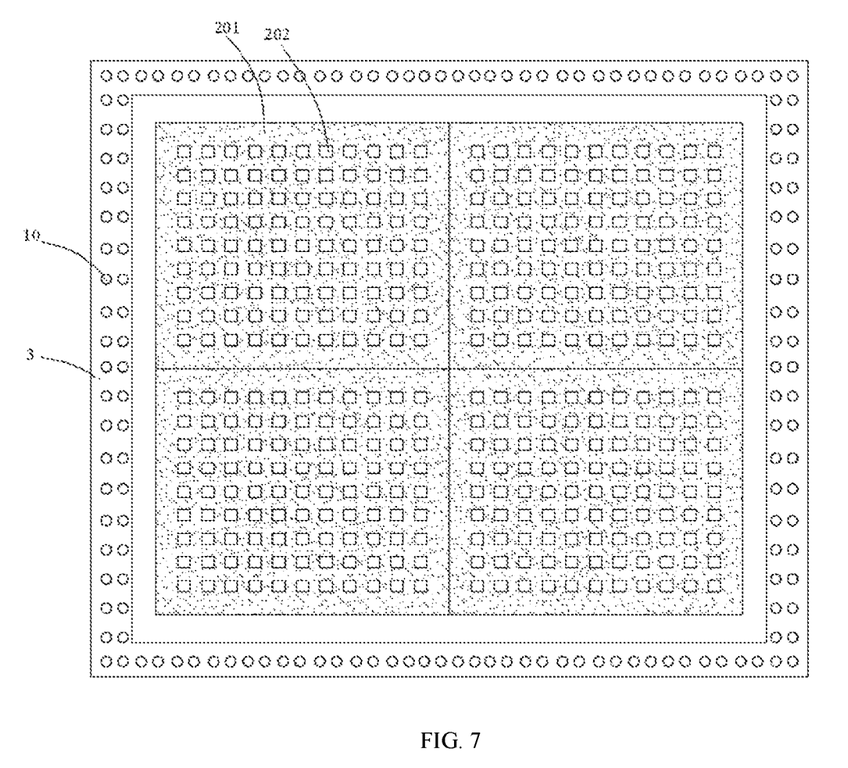
FIG. 7 is a top view of the structure shown in FIG. 6.

As shown in FIG. 2 and FIG. 3, the light-emitting substrate 2 can be disposed on the bearing surface of the back plate 1, that is, the light-emitting substrate 2 and the middle frame 3 are located on the same side of the back plate 1. A light-emitting side of the light-emitting substrate 2 faces away from the back plate 1. The light-emitting substrate 2 is located in the middle frame 3, that is, the middle frame 3 surrounds the light-emitting substrate 2. The light-emitting substrate 2 may include a base 201 and a plurality of light-emitting units 202. The base 201 may be disposed on the bearing surface of the back plate 1, and the plurality of light-emitting units 202 may be disposed on a surface of the base 201 facing away from the back plate 1. The base 201 can be a circuit board to provide power for the plurality of light-emitting units 202. Light-emitting colors of the plurality of light-emitting units 202 may be the same, for example, all of the light-emitting colors are green. The light-emitting units 202 may be light-emitting chips, such as mini light-emitting diodes (LEDs), etc. In addition, in a direction parallel to the back plate 1, the light-emitting substrate 2 may include a first light-emitting area 203 and a second light-emitting area 204. The first light-emitting area 203 may be in a block shape, the second light-emitting area 204 may be in a ring shape, and the second light-emitting area 204 may surround the first light-emitting area 203. The second light-emitting area 204 is close to the edge of the light-emitting substrate 2. An outer boundary of the first light-emitting area 203 in the block shape may coincide with an inner boundary of the second light-emitting area 204, but this is not particularly limited by the embodiments of the present disclosure. Light emitted from the first light-emitting area 203 is light emitted from the light-emitting units 202 located in the first light-emitting area 203, and the emitted light of the second light-emitting area 204 is light emitted from the light-emitting units 202 located in the second light-emitting area 204. As shown in FIG. 3 and FIG. 7, the light-emitting substrate 2 may be a lamp plate, or the light-emitting substrate 2 may be formed by splicing a plurality of lamp plates.

Figure 10:
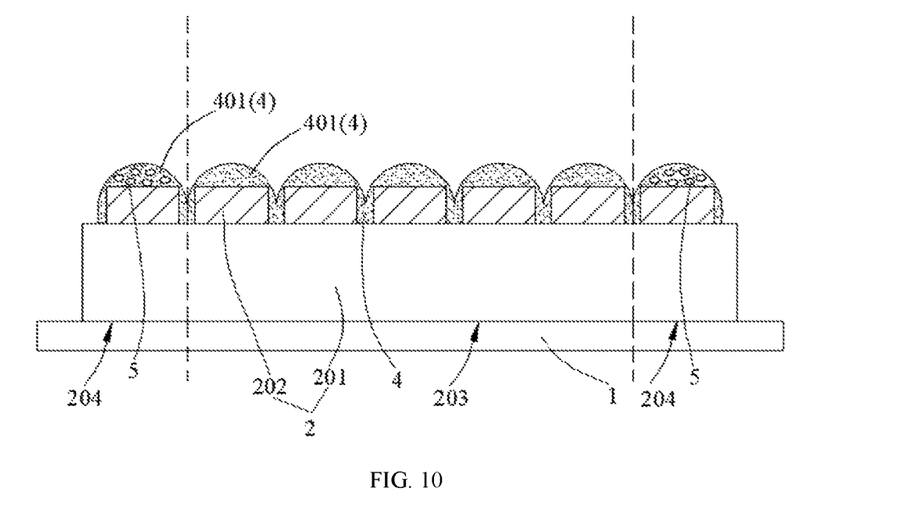
FIG. 10 is a schematic diagram of a light-emitting substrate provided with a protective layer according to an embodiment of the present disclosure.

As shown in FIG. 2, a surface of the light-emitting substrate 2 facing away from the back plate 1 is provided with a protective layer 4. That is, the protective layer 4 covers the above-mentioned plurality of light-emitting units 202 and the base 201 to prevent the light-emitting units 202 from being damaged. For example, the protective layer 4 can include a sealing/packaging adhesive. As shown in FIG. 10, the protective layer 4 may include a plurality of protective units 401. One protective unit 401 covers a light-emitting surface of one light-emitting unit 202 and is in direct contact with the light-emitting surface of the light-emitting unit 202. A surface of the protective unit 401 facing away from the light-emitting unit is a curved surface. An area of the protective layer 4 corresponding to the second light-emitting area 204 may be doped with light conversion particles 5. That is, protective units 401 of the plurality of protective units 401 corresponding to the second light-emitting area 204 may be doped with the light conversion particles 5. The light conversion particles 5 include the above-mentioned one or more light conversion materials. A light-emitting intensity of the light-emitting substrate 2 gradually decreases from an inside of the light-emitting substrate 2 to the edge of the light-emitting substrate 2. A doping concentration of the light conversion particles 5 gradually decreases along a direction that an edge of the protective layer 4 is close to an inside of the protective layer 4, that is, a direction from the edge of the protective layer 4 to the inside of the protective layer 4. Taking the protective layer 4 including a plurality of protective units 401 as an example, the forming process of the protective layer 4 may include: forming the plurality of protective units 401 through an adhesive dispensing process on a side of the plurality of light-emitting units 202 away from the base 201, where the light-emitting surfaces of the protective units 401 are curved surfaces, and one of the plurality of protective units 401 covers the light-emitting surface of one of the plurality of light-emitting units and is in direct contact with the light-emitting surface of the light-emitting unit. For the protective unit 401 doped with the light conversion particles 5, the adhesive dispensing process may include: mixing a transparent colloidal material and the light conversion particles 5, and forming the protective unit 401 through the adhesive dispensing process.

Taking the light-emitting substrate 2 including the base 201 and light-emitting chips and the protective layer 4 including a sealing adhesive as an example, the preparation method of the protective layer 4 may include: carrying out solder paste printing, die bonding, reflow soldering and cleaning on the base 201, dripping the transparent sealing adhesive in the first light-emitting area of the light-emitting substrate 2, dripping the sealing adhesive doped with the light conversion particles 5 in the second light-emitting area of the light-emitting substrate 2, and finally carrying out baking and curing.

As shown in FIG. 2 and FIG. 5, the backlight module according to the embodiments of the present disclosure may further include a dimming film. The dimming film is disposed on a side of the light-emitting substrate 2 away from the back plate 1, and at least part of areas of the dimming film in a thickness direction is located in the middle frame 3. The dimming film may include a color conversion layer 6. The color conversion layer 6 is disposed on the side of the light-emitting substrate 2 away from the back plate 1, that is, the color conversion layer 6 faces the light-emitting side of the light-emitting substrate 2. The color conversion layer 6 is used for color conversion of the light emitted from the light-emitting substrate 2. The dimming film may further include a prism sheet 7. The prism sheet 7 may be disposed on a side of the color conversion layer 6 away from the light-emitting substrate 2. The dimming film may further include a diffusion sheet 9. The diffusion sheet 9 may be located on a side of the color conversion layer 6 close to the light-emitting substrate 2.

Figure 4:
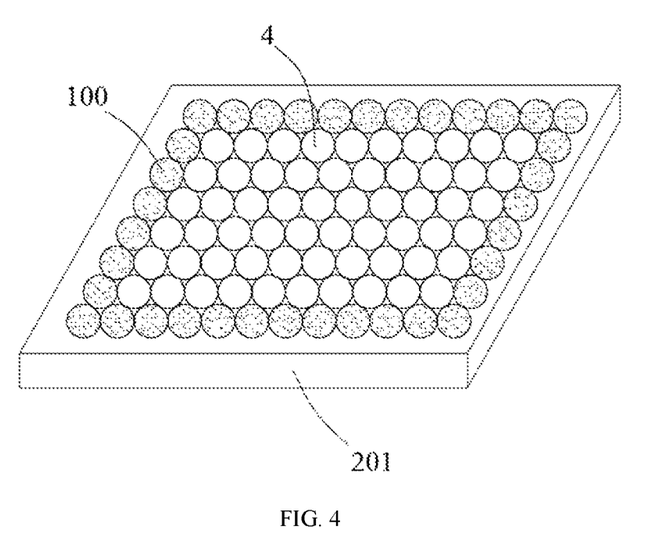
FIG. 4 is a schematic diagram of a light-emitting substrate provided with a protective layer according to an embodiment of the present disclosure.

In an embodiment of the present disclosure, as shown in FIG. 2 and FIG. 4, the light-emitting substrate 2 has a light-emitting color of blue, that is, the light-emitting substrate 2 emits blue light. The light conversion particles 5 doped in the area of the protective layer 4 corresponding to the second light-emitting area 204 include one or more yellow light conversion materials, which emit yellow light under the irradiation of blue light, so that the area of the protective layer 4 corresponding to the second light-emitting area 204 emits yellow light under the irradiation of the blue light, and the yellow light and the blue light are mixed to form white light. The blue light emitted from the light-emitting substrate 2 is blue light after passing through the area of the protective layer 4 corresponding to the first light-emitting area 203. That is, the area of the protective layer 4 corresponding to the first light-emitting area 203 is not doped with the light conversion particles 5. The color conversion layer 6 includes one or more red light conversion materials and one or more green light conversion materials. The one or more red light conversion materials can emit red light under the irradiation of the blue light, and the one or more green light conversion materials can emit green light under the irradiation of the blue light, so that the color conversion layer 6 emits red light and green light under the irradiation of the blue light.

In another embodiment of the present disclosure, as shown in FIG. 2 and FIG. 4, the light-emitting substrate 2 has a light-emitting color of blue. The light conversion particles 5 doped in the area of the protective layer 4 corresponding to the second light-emitting area 204 include one or more red light conversion materials and one or more green light conversion materials. The blue light emitted from the light-emitting substrate 2 is blue light after passing through the area of the protective layer 4 corresponding to the first light-emitting area 203. The color conversion layer 6 includes one or more red light conversion materials and one or more green light conversion material.

In yet another embodiment of the present disclosure, as shown in FIG. 2 and FIG. 4, the light-emitting substrate 2 has a light-emitting color of blue. The light conversion particles 5 doped in the area of the protective layer 4 corresponding to the second light-emitting area 204 include one or more yellow light conversion materials. The blue light emitted from the light-emitting substrate 2 is blue light after passing through the area of the protective layer 4 corresponding to the first light-emitting area 203. The color conversion layer 6 includes one or more yellow light conversion materials.

In yet another embodiment of the present disclosure, as shown in FIG. 2 and FIG. 4, the light-emitting substrate 2 has a light-emitting color of blue. The light conversion particles 5 doped in the area of the protective layer 4 corresponding to the second light-emitting area 204 include one or more red light conversion materials and one or more green light conversion materials. The blue light emitted from the light-emitting substrate 2 is blue light after passing through the area of the protective layer 4 corresponding to the first light-emitting area 203. The color conversion layer 6 includes one or more yellow light conversion materials.

In other embodiments of the present disclosure, as shown in FIG. 2 and FIG. 4, the light-emitting substrate 2 has a light-emitting color of blue. The light conversion particles 5 doped in the area of the protective layer 4 corresponding to the second light-emitting area 204 include one or more red light conversion materials and one or more green light conversion materials. An area of the protective layer 4 corresponding to the first light-emitting area 203 is doped with one or more red light conversion materials. The color conversion layer 6 is a green quantum dot layer, which can emit green light under the irradiation of the blue light.

As shown in FIG. 2 and FIG. 5, the light compensation structure 100 can be disposed between the light-emitting substrate 2 and the color conversion layer 6. That is, the light compensation structure 100 is located on the side of the light-emitting substrate 2 away from the back plate 1, and the color conversion layer 6 is located on a side of the light compensation structure 100 away from the back plate 1. An orthographic projection of the light compensation structure 100 on the back plate 1 does not coincide with an orthographic projection of the first light-emitting area 203 of the light-emitting substrate 2 on the back plate 1. That is, in the direction parallel to the back plate 1, the light compensation structure 100 is located to the side of the first light-emitting area 203, and the second light-emitting area 204 is also located to the side of the first light-emitting area 203, so that the light compensation structure 100 is located close to the second light-emitting area 204, and the light emitted from the light compensation structure 100 is easily mixed with the light emitted from the second light-emitting area 204. Further, the orthographic projection of the light compensation structure 100 on the back plate 1 surrounds the orthographic projection of the first light-emitting area 203 on the back plate 1. The light compensation structure 100 includes one or more light conversion materials for converting the color of the light emitted by the light-emitting substrate 2. The one or more light conversion materials include one or more fluorescent materials or quantum dot materials, or may also include one or more phosphorescent materials. The one or more fluorescent materials may be organic fluorescent materials, inorganic fluorescent materials or fluorescent dyes.

Figure 8:
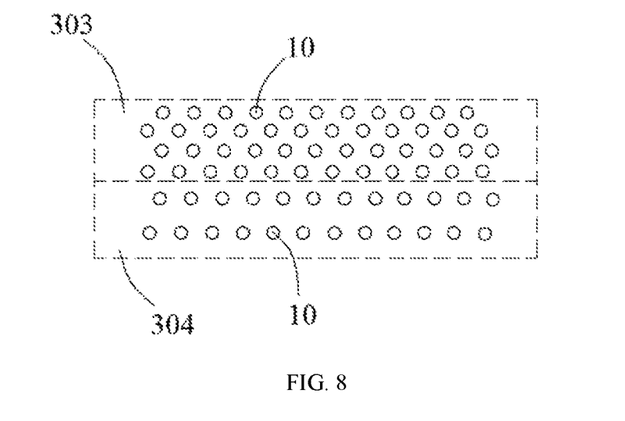
FIG. 8 is a schematic diagram of a distribution of light conversion units according to an embodiment of the present disclosure.
Figure 9:
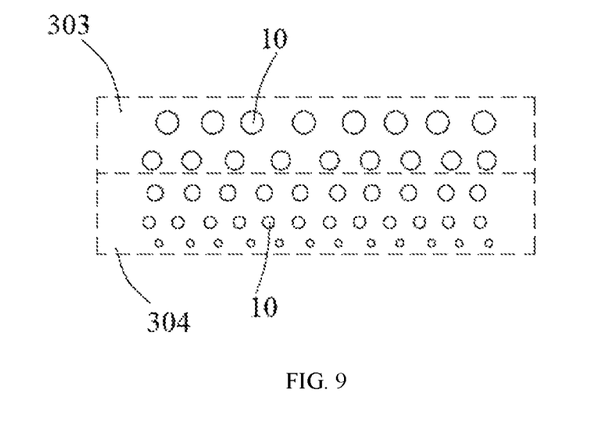
FIG. 9 is a schematic diagram of a distribution of light conversion units according to an embodiment of the present disclosure.

As shown in FIG. 2 and FIG. 4, the light compensation structure 100 can be disposed on the light-emitting substrate 2. Specifically, the area of the protective layer 4 corresponding to the second light-emitting area 204 is doped with the light conversion particles 5, and the area of the protective layer 4 doped with the light conversion particles 5 constitutes the light compensation structure 100. In addition, as shown in FIG. 5 and FIG. 6, the light compensation structure 100 may be disposed on an inner wall of the middle frame 3. The light compensation structure 100 disposed on the inner wall of the middle frame 3 may include a plurality of light conversion units 10. The light conversion units 10 include the above-mentioned one or more light conversion materials. Taking the light emitted from the light-emitting substrate 2 being blue light as an example, the light conversion units 10 can be yellow light conversion units 10, that is, the light conversion units 10 can emit yellow light under the irradiation of blue light. The plurality of light conversion units 10 may be distributed on the inner wall of the middle frame 3 at intervals. As shown in FIG. 8, the inner wall of the middle frame 3 provided with the light conversion units 10 includes a first area 303 and a second area 304 with a same area/size. The first area 303 is located on a side of the second area 304 away from the light-emitting substrate 2. A density of the light conversion units 10 disposed in the first area 303 is greater than that of the light conversion units 10 disposed in the second area 304. That is, the number of the light conversion units 10 disposed in the first area 303 is greater than that of the light conversion units 10 disposed in the second area 304. In other embodiments of the present disclosure, as shown in FIG. 9, a size of the light conversion units 10 disposed in the first area 303 is larger than that of the light conversion units 10 disposed in the second area 304. That is, a mass of the light conversion materials contained in the light conversion units 10 disposed in the first area 303 is greater than that of the light conversion materials contained in the light conversion units 10 disposed in the second area 304. Taking the middle frame 3 including the first frame segment 301 and the second frame segment 302 connected to each other as an example, the first area 303 may be located on the inner wall of the second frame segment 302, and the second area 304 may be located on an inner wall of the first frame segment 301. Since the inner diameter of the second frame segment 302 is larger than the inner diameter of the first frame segment 301, the intensity of the light emitted from the light-emitting substrate 2 to the second frame segment 302 is smaller than the intensity of the light emitted from the light-emitting substrate 2 to the first frame segment 301. In addition, the inner wall of the middle frame 3 can also be provided with a reflector 305, and the light conversion units 10 are disposed on the reflector 305.

For example, as shown in FIG. 5, the reflector 305 can be disposed on an upper part of the inner wall of the middle frame 3 flush with or higher than an upper surface of the base 201 and the upper surface of the base 201. The reflector 305 can improve the brightness. In some embodiments, the reflector 305 can be disposed on the upper part of the inner wall of the middle frame 3 flush with or higher than the upper surface of the base 201 and the upper surface of the base 201 in a form of a whole sheet. In some embodiments, the reflector 305 can be separately disposed on the upper part of the inner wall of the middle frame 3 flush with or higher than the upper surface of the base 201 and the upper surface of the base 201 in a form of a plurality of sheets, then, for example, a reflector disposed on the upper part of the inner wall of the middle frame 3 flush with or higher than the upper surface of the base 201 can be connected with a reflector on the upper surface of the base 201 by such as pressing.

One or more embodiments of the present disclosure also provide a display device. The display device may include the backlight module described in any one of the above embodiments. In addition, as shown in FIG. 1, FIG. 2 and FIG. 5, the display device may further include a display panel 8. Since the backlight module included in the display device according to the embodiments of the present disclosure is the same as the backlight module according to the above-mentioned embodiments of the backlight module, they have the same beneficial effects, and the details are not described herein again.

The above is only the exemplary embodiments of the present disclosure, and does not limit the present disclosure in any form. Although the present disclosure has been disclosed as above in the exemplary embodiments, it is not intended to limit the present disclosure. Any technical personnel familiar with the art, without departing from the scope of the technical solutions of the present disclosure, can make some changes or modifications to equivalent embodiments of equivalent changes by using the technical contents disclosed above. Any simple modifications, equivalent changes and modifications made to the above embodiments according to the technical essence of the present disclosure that do not depart from the contents of the technical solutions of the present disclosure still fall within the scope of the technical solutions of the present disclosure.

The invention claimed is:

1. A backlight module, comprising:
a back plate;
a middle frame disposed on the back plate;
a light-emitting substrate disposed on the back plate and in the middle frame, the light-emitting substrate comprising a first light-emitting area and a second light-emitting area surrounding the first light-emitting area, and the second light-emitting area being close to an edge of the light-emitting substrate; and
a light compensation structure close to the edge of the light-emitting substrate, the light compensation structure comprising one or more light conversion materials;
wherein a surface of the light-emitting substrate facing away from the back plate is provided with a protective layer, an area of the protective layer corresponding to the second light-emitting area is doped with light conversion particles, and the area of the protective layer doped with the light conversion particles constitutes the light compensation structure;
wherein the light-emitting substrate comprises:
a base disposed on the back plate; and
a plurality of light-emitting units disposed on a surface of the base facing away from the back plate,
wherein the protective layer comprises a plurality of protective units, one protective unit of the plurality of protective units covers a light-emitting surface of one light-emitting unit of the plurality of light-emitting units and is in direct contact with the light-emitting surface of the light-emitting unit, and a surface of the protective unit facing away from the light-emitting unit is a curved surface;
or,
wherein the light compensation structure is disposed on an inner wall of the middle frame, wherein the light compensation structure comprises: a plurality of light conversion units disposed on the inner wall of the middle frame;
wherein the inner wall of the middle frame provided with the plurality of light conversion units comprises a first area and a second area with a same area, the first area is located on a side of the second area away from the light-emitting substrate, and a density of the light conversion units disposed in the first area is greater than a density of the light conversion units disposed in the second area; or
wherein the inner wall of the middle frame provided with the plurality of light conversion units comprises a first area and a second area, the first area is located on a side of the second area away from the light-emitting substrate, and a size of the light conversion units disposed in the first area is larger than a size of the light conversion units disposed in the second area.

2. The backlight module according to claim 1, wherein the light-emitting substrate has a light-emitting color of blue, and the light conversion particles comprise one or more yellow light conversion materials.

3. The backlight module according to claim 1, wherein the light-emitting substrate has a light-emitting color of blue, and the light conversion particles comprise one or more red light conversion materials and one or more green light conversion materials.

4. The backlight module according to claim 2, wherein light emitted from the first light-emitting area is blue light after passing through an area of the protective layer corresponding to the first light-emitting area, and the backlight module further comprises a color conversion layer disposed on a side of the light-emitting substrate away from the back plate, wherein the color conversion layer comprises one or more red light conversion materials and one or more green light conversion materials, or the color conversion layer comprises one or more yellow light conversion materials.

5. The backlight module according to claim 3, further comprising a color conversion layer disposed on a side of the light-emitting substrate away from the back plate, wherein the color conversion layer is a green quantum dot layer, and an area of the protective layer corresponding to the first light-emitting area is doped with one or more red light conversion materials.

6. The backlight module according to claim 1, wherein the protective layer comprises a sealing adhesive.

7. The backlight module according to claim 1, wherein a doping concentration of the light conversion particles gradually decreases along a direction from an edge of the protective layer to an inside of the protective layer.

8. The backlight module according to claim 1, wherein the middle frame comprises a first frame segment and a second frame segment that are connected to each other, the first frame segment is disposed on the back plate, the second frame segment is disposed on a side of the first frame segment away from the back plate, an inner diameter of the second frame segment gradually increases along a direction away from the first frame segment, the first area is located on an inner wall of the second frame segment, and the second area is located on an inner wall of the first frame segment.

9. The backlight module according to claim 1, wherein the inner wall of the middle frame is provided with a reflector, and the plurality of light conversion units are disposed on the reflector.

10. The backlight module according to claim 1, wherein the light-emitting substrate has a light emission color of blue, and the plurality of light conversion units are yellow light conversion units.

11. The backlight module according to claim 1, wherein the one or more light conversion materials comprise one or more fluorescent materials or quantum dot materials.

12. The backlight module according to claim 3, wherein light emitted from the first light-emitting area is blue light after passing through an area of the protective layer corresponding to the first light-emitting area, and the backlight module further comprises a color conversion layer disposed on a side of the light-emitting substrate away from the back plate, wherein the color conversion layer comprises one or more red light conversion materials and one or more green light conversion materials, or the color conversion layer comprises one or more yellow light conversion materials.

13. The backlight module according to claim 1, wherein the middle frame comprises a first frame segment and a second frame segment that are connected to each other, the first frame segment is disposed on the back plate, the second frame segment is disposed on a side of the first frame segment away from the back plate, an inner diameter of the second frame segment gradually increases along a direction away from the first frame segment, the first area is located on an inner wall of the second frame segment, and the second area is located on an inner wall of the first frame segment.

14. A display device, comprising a backlight module, wherein the backlight module comprises:
  a back plate;
  a middle frame disposed on the back plate;
  a light-emitting substrate disposed on the back plate and in the middle frame, the light-emitting substrate comprising a first light-emitting area and a second light-emitting area surrounding the first light-emitting area, and the second light-emitting area being close to an edge of the light-emitting substrate; and
  a light compensation structure close to the edge of the light-emitting substrate, the light compensation structure comprising one or more light conversion materials;
  wherein a surface of the light-emitting substrate facing away from the back plate is provided with a protective layer, an area of the protective layer corresponding to the second light-emitting area is doped with light conversion particles, and the area of the protective layer doped with the light conversion particles constitutes the light compensation structure;
  wherein the light-emitting substrate comprises:
  a base disposed on the back plate; and
  a plurality of light-emitting units disposed on a surface of the base facing away from the back plate,
    wherein the protective layer comprises a plurality of protective units, one protective unit of the plurality of protective units covers a light-emitting surface of one light-emitting unit of the plurality of light-emitting units and is in direct contact with the light-emitting surface of the light-emitting unit, and a surface of the protective unit facing away from the light-emitting unit is a curved surface;
or,
wherein the light compensation structure is disposed on an inner wall of the middle frame, wherein the light compensation structure comprises: a plurality of light conversion units disposed on the inner wall of the middle frame;
  wherein the inner wall of the middle frame provided with the plurality of light conversion units comprises a first area and a second area with a same area, the first area is located on a side of the second area away from the light-emitting substrate, and a density of the light conversion units disposed in the first area is greater than a density of the light conversion units disposed in the second area; or
  wherein the inner wall of the middle frame provided with the plurality of light conversion units comprises a first area and a second area, the first area is located on a side of the second area away from the light-emitting substrate, and a size of the light conversion units disposed in the first area is larger than a size of the light conversion units disposed in the second area.

* * * * *